United States Patent [19]

Lin

[11] Patent Number: 4,863,346
[45] Date of Patent: Sep. 5, 1989

[54] OUTER CASING ASSEMBLY FOR CEILING-FAN MOTORS

[76] Inventor: Simon Lin, No. 160, Yu-Tsai St., Feng-Yuan City, Taichung, Hsien, Taiwan

[21] Appl. No.: 308,857

[22] Filed: Feb. 9, 1989

[51] Int. Cl.$^4$ ............................................. F04D 29/64
[52] U.S. Cl. ....................................... 416/5; 416/93 R
[58] Field of Search ....................... 416/5, 170 C, 93 R

[56] References Cited

U.S. PATENT DOCUMENTS

| | | | |
|---|---|---|---|
| D. 270,757 | 9/1983 | Dennis | D23/158 |
| D. 270,943 | 10/1983 | Dennis | D23/163 |
| 1,940,318 | 12/1933 | Morse | 416/5 X |
| 4,391,570 | 7/1983 | Stutzman | 416/93 R X |
| 4,402,649 | 9/1983 | Laurel | 416/170 C X |
| 4,657,485 | 4/1987 | Hartwig | 416/5 X |
| 4,666,670 | 5/1987 | Cox | 416/5 X |

Primary Examiner—Everette A. Powell, Jr.
Attorney, Agent, or Firm—Townsend & Townsend

[57] ABSTRACT

An outer casing assembly for ceiling-fan motors includes an upper cover with a top surface and a downward-curving flange, having a central opening in the top surface and a plurality of bolt holes in the periphery of the downward-curving flange; a middle guard shell formed in a hollow body structure with an external circumference corresponding to the inner periphery of the downward-curving flange of the upper cover; and a lower cover with a bottom surface and an upward-curving flange corresponding to the structure of the upper cover, having a lower central opening in the bottom surface and a plurality of bolt holes in the periphery of the upward-curving flange. The upper cover, the middle guard shell and the lower cover are all made of mesh material, wherein the middle guard shell is vertically positioned between the upper cover and the lower cover both of which are connected together by screw bolts through the bolt holes of both the upper and lower covers.

1 Claim, 3 Drawing Sheets

OUTER CASING ASSEMBLY FOR CEILING-FAN MOTORS

BACKGROUND OF THE INVENTION

This invention relates to an outer casing assembly for ceiling-fan motors, and particularly to the kind of outer casing assembly being combined of different parts, each of which is integrally formed with mesh material so as to achieve a complete heat dissipation effect.

Conventionally, ceiling-fan motors are usually received in an outer casing structure, which is normally made of metal, glass or acrylic materials and formed into an enclosure. With an enclosed structure, when the ceiling-fan motor is in operation, heat will be produced and accomulated within the outer casing structure, causing a serious problem of heat dissipation. In order to solve this problem, an improvement has been made on the outer casing structure by providing a plurality of draft holes in the outer casing assembly. A typical structure of this known outer casing assembly is shown in FIG. 1, wherein the outer casing assembly 1 is a combination of an upper casing 2 and a lower casing 2'. In the periphery of both top surfaces of the upper casing 2 and the lower casing 2', a plurality of rectangular draft holes 21 (21') are provided with a pair of upwardly radiating pieces 22 (22') being formed on the opposing sides of each draft hole 21 (21') for heat dissipation purposes. However, as the draft holes 21 (21') and the radiating pieces 22 (22') in the known outer casing assembly are confined to a limted area, the problem of heat accumulation is not effectively improved and therefore still requires remedying.

SUMMARY OF THE INVENTION

It is accordingly a primary object of the present invention to provide an improved outer casing assembly for ceiling-fan motors with a combination of different structures each of which is integrally made of mesh materal and configured for achieving a complete heat dissipation effect.

This and other objects of the present invention are achieved by providing an improved outer casing assembly for ceiling-fan motors. The outer casing assembly according to the present invention includes: an upper cover, integrally formed with a top surface and a downward-curving flange, having a central opening in the top surface and a plurality of bolt holes evenly located in a periphery of the downward-curving flange; a middle guard shell, integrally formed in a hollow body structure, with an external circumference thereof corresponding to the inner circumferential edge of the downward-curving flange of the upper cover; and a lower cover integrally formed with a bottom surface and an upward-curving flange corresponding to the structure of the upper cover, having a lower central opening in the bottom surface and a plurality of bolt holes in the periphery of the upward-curving flange. The upper cover, the middle guard shell and the lower cover are all made of a mesh material for perfect heat disspation, the middle guard shell being fitted between the upper cover and the lower cover both of which are connected together by a plurality of screw bolts through the bolt holes so that a desired outer casing assembly for ceiling-fan motors is achieved accordingly.

Other advantages and characteristics of the present invention will become apparent from the following detailed description of a preferred embodiment of an outer casing assembly for ceiling-fan motors when read in conjunction with the accompanying drawings.

DETAILED DESCRIPTION OF THE THE PREFERRED EMBODIMENT

Figure 1:
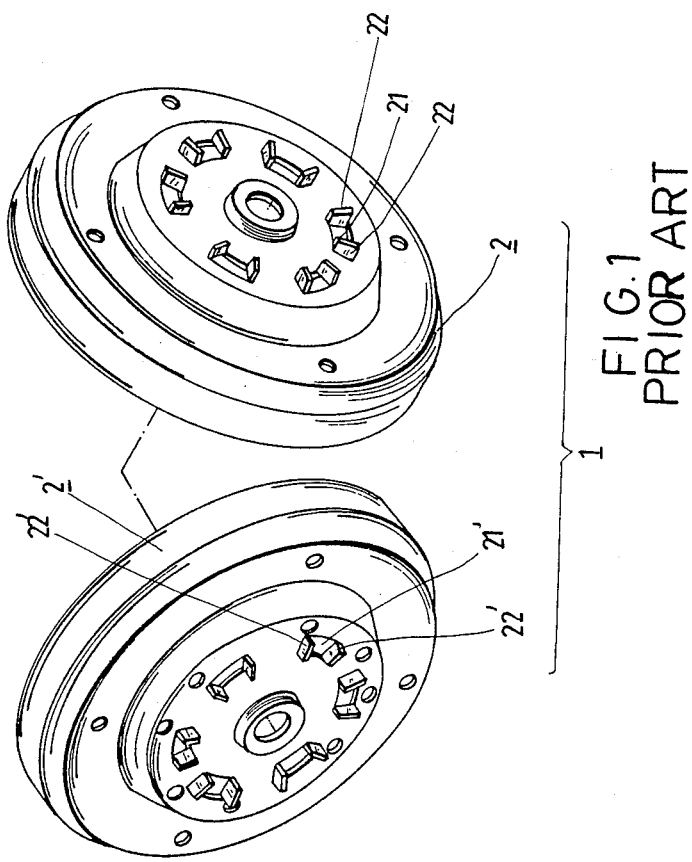
FIG. 1 is an exploded and perspective view of a known outer casing assembly for ceiling-fan motors.
Figure 2:
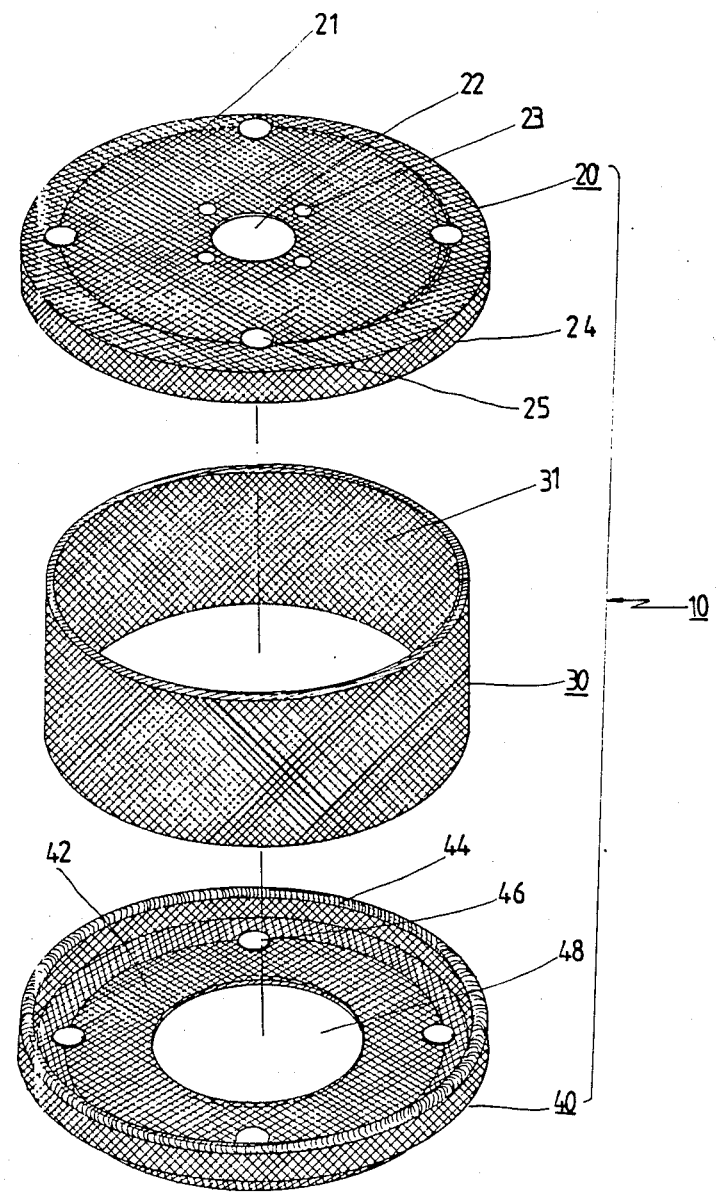
FIG. 2 is an exploded and perspective view of a preferred embodiment of an outer casing assembly for ceiling-fan motors according to the present invention.
Figure 3:
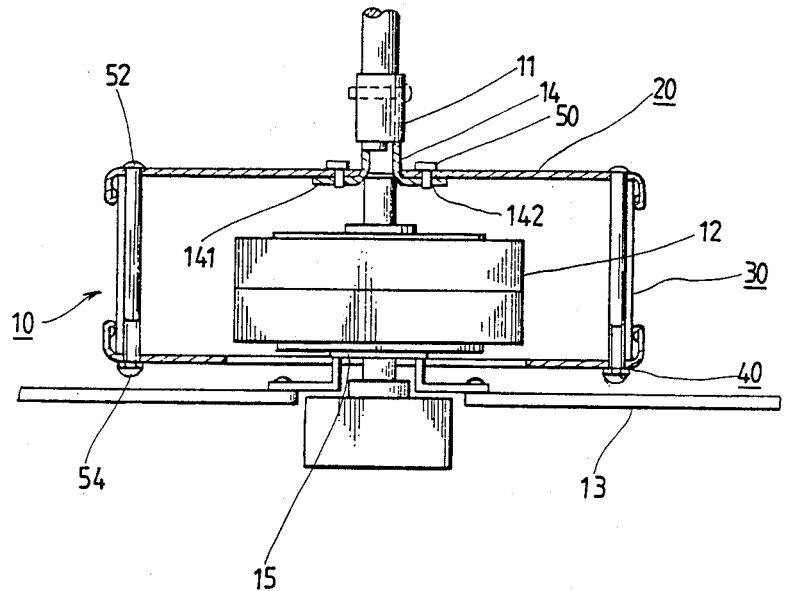
FIG. 3 is an axial sectional view of the preferred embodiment of FIG. 1 in combination.

Referring to FIGS. 2 and 3, the preferred embodiment of an improved outer casing assembly 10 for ceiling-fan motors according to the present invention includes an upper cover 20, a middle guard shell 30 and a lower cover 40, all of which are made of mesh material for achieving a complete heat dissipation effect.

The upper cover 20 is integrally formed with a disc top surface 21 and a downward-curving flange 24, and having an upper central opening 22 in the top surface 21, a plurality of orifices 23 symmetrically located around the central opening 22, and a plurality of upper bolt holes 25 separately located in the periphery of the downward-curving flange 24.

The middle guard shell 30 is integrally formed in a cylindrical hollow body 31 with an external circumference thereof corresponding to the inner edge of the downward-curving flange 24 of the upper cover 20.

The lower cover 40 is integrally formed with a bottom surface 42 and an upward-curving flange 44 corresponding to the structure of the upper cover 20, and includes a lower central opening 48 in the bottom surface and a plurality of lower bolt holes 46 separately located in the periphery of the upward-curving flange 44.

In assembling the preferred embodiment of the outer casing body 10, the lower cover 40 is positioned through the lower portion of the motor supporting shaft 11 with the front portion of the vane impeller 15 freely located in the lower center opening 48, as shown in FIG. 3. The middle guard sheel 30 is then placed around the motor 12 through an upper portion of the supporting axle 11 with the lower edge of the hollow body 31 located along the inner peripheral edge of the upward-curving flange 44 of the lower cover 40, afterwhith coupling the upper cover 20 is coupled with the upper edge of the middle guard shell 30 through the motor supporting axle 11 by positioning the inner edge of the downward-curving flange on the upper end edge of the middle guard shell 30 aligning both the upper and the lower bolt holes 25, 46 thereat, and finally, connecting the three parts of the outer casing assembly 10 together with a plurality of screw bolts 52 and screws 54, which are fastened between the upper cover 20 and the lower cover 40 through the aligned bolt holes 25, 46 with each screw bolt 52 vertically positioned along the internal wall of the middle guard shell 30. thus, a desired outer casing assembly 10 for ceiling-fan motors is completed. In addition, as shown in FIG. 3, the upper cover 20 is also connected to a coupling member 14, which is fixed around the upper portion of the supporting axle 11 with the lower disc plate 141 being brought to abut against the inner top surface of the upper cover 20 by means of a plurality of screws 50 fastened in the orifices 23 of the upper cover 20.

While a preferred embodiment has been chosen to illustrate the present invention, it will be understood by those skilled in the art that various changes and modifications can be made therein without departing from the scope of the present invention as defined in the appended claims.

What I claim is:

1. An outer casing assembly for ceiling-fan motors comprising:

an upper cover integrally formed with a top surface and a downward-curving flange, having an upper central opening in said top surface, a plurality of orifices symmetrically located around said upper central opening, and a plurality of bolt holes separately located in a periphery of said downward-curving flange;

a middle guard shell integrally formed in a hollow body structure, having an external circumference thereof corresponding to an inner circumference of said downward-curving flange of said upper cover; and a lower cover integrally formed with a bottom surface and an upward-curving flange in connection with said upper cover, having a lower central opening in said bottom surface and a plurality of bolt holes separately located in a periphery of said upward-curving flange;

said upper cover, said middle guard shell and said lower cover all being made of a mesh material, and said middle guard shell being vertically positioned between said upper cover and said lower cover through said downward-curving flange and said upward-curving flange, and said upper cover and said lower cover being connected together by a plurality of screw bolts through said bolt holes of both the upper and the lower covers.

* * * * *